United States Patent
Shakir et al.

(10) Patent No.: US 7,130,113 B2
(45) Date of Patent: Oct. 31, 2006

(54) PASSIVE PHASING OF FIBER AMPLIFIERS

(75) Inventors: Sami A. Shakir, Albuquerque, NM (US); Sami T. Hendow, Los Altos, CA (US); William Robert Culver, Albuquerque, NM (US); Burke E. Nelson, Albuquerque, NM (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/015,671

(22) Filed: Dec. 20, 2004

(65) Prior Publication Data

US 2006/0132903 A1   Jun. 22, 2006

(51) Int. Cl.
*H04B 10/12* (2006.01)
*H01S 4/00* (2006.01)

(52) U.S. Cl. ............ 359/349; 359/337; 359/298; 372/6

(58) Field of Classification Search ............ 359/333, 359/298, 337, 349; 372/6
See application file for complete search history.

(56) References Cited

U.S. PATENT DOCUMENTS

| | | | |
|---|---|---|---|
| 5,037,173 A * | 8/1991 | Sampsell et al. | 385/17 |
| 6,366,356 B1 * | 4/2002 | Brosnan et al. | 356/477 |
| 6,400,871 B1 * | 6/2002 | Minden | 385/39 |
| 6,424,404 B1 * | 7/2002 | Johnson | 355/44 |
| 6,480,327 B1 * | 11/2002 | Betin | 359/338 |
| 6,570,704 B1 * | 5/2003 | Palese | 359/349 |
| 6,584,133 B1 | 6/2003 | Walker et al. | |
| 6,724,523 B1 * | 4/2004 | Yap | 359/333 |
| 2004/0081396 A1 * | 4/2004 | Komine et al. | 385/33 |

FOREIGN PATENT DOCUMENTS

EP            980123 A2  *  2/2000
JP       2000056280 A   *  2/2000

* cited by examiner

*Primary Examiner*—Jack Keith
(74) *Attorney, Agent, or Firm*—Andrews Kurth LLP

(57) ABSTRACT

A method passively locks and phases an array of fiber amplifiers in a fiber amplifier system that emits a beam, such as a laser beam. The method locks the fiber amplifiers so that the fiber amplifiers operate at same or similar frequencies. The method samples a small portion of the emitted beam in a far-field around a central lobe on an optical axis and then couples this portion of emitted beam back into the array of fiber amplifiers. The fiber amplifiers may be phased so that the emitted beam concentrates its energy around the central lobe in the far-field. Phasing may be achieved by using an aperture, for example, to restrict the portion of the emitted beam to be coupled back to a restricted region around the optical axis.

17 Claims, 6 Drawing Sheets

_US 7,130,113 B2_

PASSIVE PHASING OF FIBER AMPLIFIERS

TECHNICAL FIELD

The technical field relates to fiber amplifiers, and, in particular, to passive locking and phasing of an array of fiber amplifiers.

BACKGROUND

High power solid-state lasers, for military and industrial applications, have been the focus of vigorous recent research. Several current approaches include slab lasers and heat capacity lasers for bulk solid-state laser systems, and coherent fiber laser arrays for fiber based laser systems. The major problem confronting methods employing bulk solid-state materials used in bulk solid-state laser systems is heat management. Thermal gradients cause the laser beam to deteriorate in quality. In addition, system efficiency deteriorates due to high temperature's negative impact on the inversion process. The major problem confronting the fiber based laser systems is the complexity associated with actively (i.e., electro-optically) phasing a large number of single-mode fiber amplifiers employed in fiber phasing, especially when the number of fiber amplifiers is large. Employing single-mode fiber amplifiers in these fiber amplifier arrays is necessary to preserve good beam quality for the total system output. However, power scaling in single-mode fiber amplifiers is limited in current solutions.

SUMMARY

A method for passive phasing of fiber amplifiers includes placing an optical device at a far-field of an array of fiber amplifiers and emitting a beam from the array of fiber amplifiers. The method further includes coupling a first portion of the emitted beam back into the array of fiber amplifiers through a coupling hole. Only the first portion of the emitted beam propagates through the coupling hole.

A corresponding system for passive phasing of fiber amplifiers includes an array of fiber amplifiers including a plurality of fiber amplifiers. The array of fiber amplifiers emits a beam. The system further includes an optical device placed at a far-field of the array of fiber amplifiers, wherein the optical device couples a first portion of the emitted beam back into the array of fiber amplifiers through a coupling hole. Only the first portion of the emitted beam propagates through the coupling hole.

In one exemplary embodiment, the optical device is a mirror positioned in the far-field of the array of fiber amplifiers, the optical device is placed around a central lobe on an optical axis of the an array of fiber amplifiers, and only the first portion of the emitted beam that is in-phase propagates through the coupling hole. In another exemplary embodiment, the optical device is a collimating mirror that couples the first portion of the emitted beam to an array of fiber pre-amplifiers before coupling the first portion of the emitted beam to the array of fiber amplifiers. In yet another exemplary embodiment, the optical device is a beamsplitter that redirects the first portion of the emitted beam to a tuning grating. In still another exemplary embodiment, the optical device is a beamsplitter enclosed in an input head. The input head also includes a second harmonic generator (SHG) crystal for frequency doubling.

DESCRIPTION OF THE DRAWINGS

The exemplary embodiments of the method and system for passive phasing of fiber amplifiers will be described in detail with reference to the following figures, in which like numerals refer to like elements, and wherein.

DETAILED DESCRIPTION

A method passively locks and phases an array of fiber amplifiers in a fiber amplifier system that emits a beam, such as a laser beam. The method locks the fiber amplifiers so that the fiber amplifiers operate at same or similar frequencies. The method samples a small portion of the emitted beam in a far-field around a central lobe on an optical axis and then couples this portion of emitted beam back into the array of fiber amplifiers. The fiber amplifiers may be phased so that the emitted beam concentrates its energy around the central lobe in the far-field. Phasing may be achieved by using an aperture, for example, to restrict the portion of the emitted beam to be coupled back to a restricted region around the optical axis. The far-field typically collects the output of all the fiber amplifiers. Coupling a portion of this far-field emitted beam back into the fiber amplifiers ensures strong coupling of all the fiber amplifiers because each fiber amplifier is effectively coupled to all other fiber amplifiers in the fiber amplifier system. This method thus leads to a more robust coupling.

When the output of all of the fiber amplifiers are in-phase, the fiber amplifier system is in an in-phase mode, i.e., longitudinal mode. The in-phase mode typically has the highest intensity around the central lobe on the optical axis in the far-field. On the other hand, an out-of-phase mode (where the output of the fiber amplifiers are out-of-phase) typically has zero intensity on the optical axis. The intensity for the in-phase mode on the optical axis may be proportional to $N^2$, where N is the total number of fiber amplifiers in the array. The far-field distance may be a few decimeters, which is a short distance so that no additional optics are required to transmit the emitted beam to the far-field.

A typical fiber amplifier has a relatively broad gain line-width and can support hundreds of thousands of longitudinal modes. The method can therefore find one or more longitudinal modes, referred to as resonant modes, within the gain line-width that result in perfect phasing of non-identical fiber amplifiers. In addition, the method automatically may correct mechanical and thermal perturbations by rapidly (within microseconds) adapting to a new longitudinal mode, thus ensuring the phasing of the fiber amplifiers. Furthermore, the fiber amplifiers may be preceded by fiber pre-amplifiers to enhance the feedback signal. Therefore, only a small portion, such as a few percent, of the emitted beam needs to be coupled back into the fiber amplifiers. Most of the emitted beam may be passed through to the output. As a result, the loss due to feedback is low, leading to an efficient fiber amplifier system.

Figure 1:
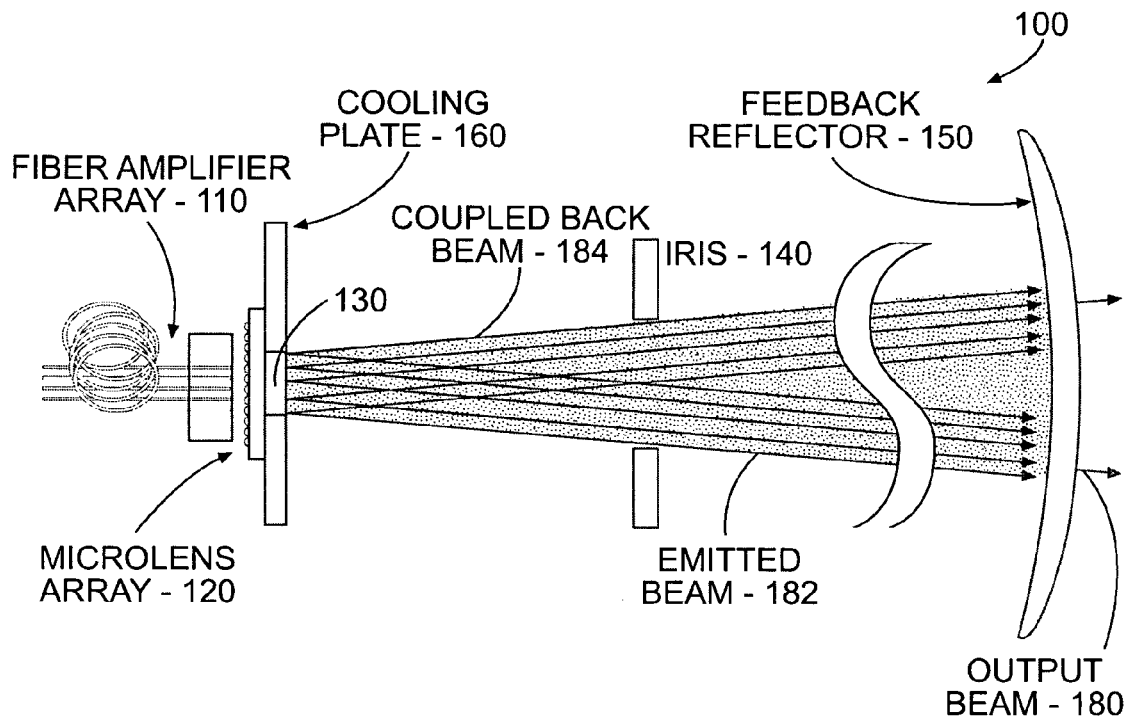
FIGS. 1–6 illustrate exemplary embodiments of a fiber amplifier system for passive phasing of fiber amplifiers.

FIG. 1 illustrates an exemplary embodiment of a fiber amplifier system 100 for passive phasing of fiber amplifiers. The system 100 includes an array of fiber amplifiers 110 connected to an array of microlenses 120, such as collimating microlenses. The fiber amplifier array 110 emits a beam 182, such as a laser beam, using the microlens array 120.

The system 100 further includes a feedback reflector 150 to couple a portion of the far-field emitted beam 182 back into the fiber amplifier array 110. The coupled back portion, referred to as a coupled back beam 184, may be ten or twenty percent of the emitted beam 182. The feedback reflector 150 may be a meniscus lens with, for example, a ten or twenty percent reflectance to reflect the emitted beam 182. The system 100 may include an iris 140 that blocks most of the energy except for the central lobe. While the different embodiments of the fiber amplifier system is described using in-phase modes, those skilled in the art will readily appreciate that the fiber amplifier system can be applied to all types of passive phasing mechanism, regardless of the selection of in-phase or out-of-phase modes.

Figure 2:
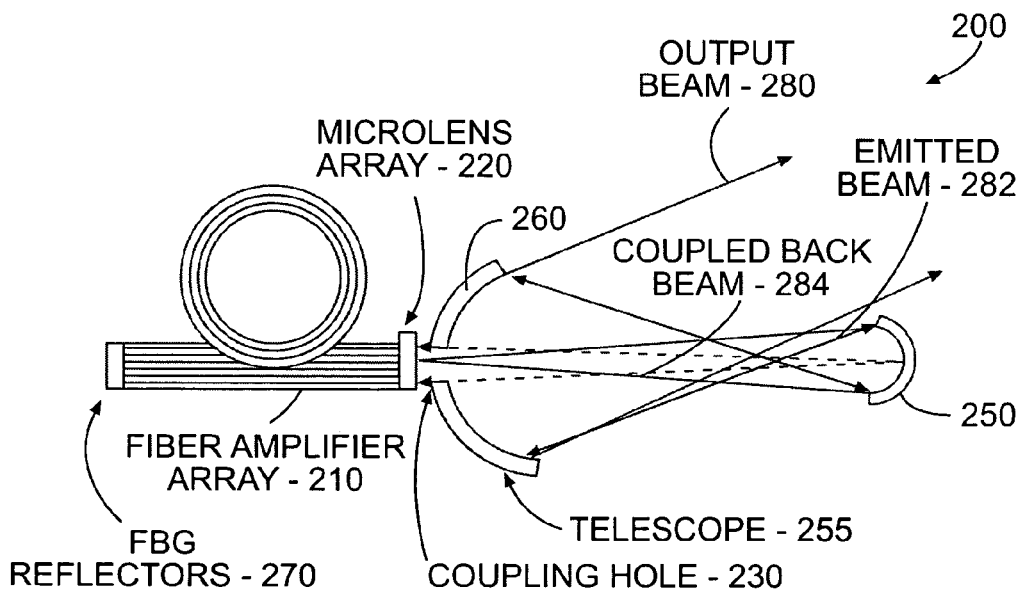

The fiber amplifier array 110 may form double-pass amplifiers by terminating each fiber amplifier with a high reflectivity fiber Bragg grating (FBG) (e.g., see FBG 270 in FIG. 2). FBG deflects beams completely. Referring to FIG. 1, the coupled back beam 184 is coupled back to the fiber amplifier array 110 through a coupling hole 130, i.e., an aperture, in a cooling plate 160. The rest of the emitted beam 182, i.e., the portion that is not reflected back into the fiber amplifier array 110, is transmitted through the feedback reflector 150 as an output beam 180. Additional optics well known in the art may be used to collimate the output beam 180.

FIG. 2 illustrates a second exemplary embodiment of the fiber amplifier system 200 for passive phasing of fiber amplifiers. The system 200 is suitable for high power scaling. The system 200 includes an array of fiber amplifiers 210 connected to an array of collimating microlenses 220. The fiber amplifier array 210 emits a beam 282, such as a laser beam, using the microlens array 220. The fiber amplifier array 210 may form double-pass amplifiers by terminating each fiber amplifier with a high reflectivity FBG 270.

The system 200 further includes two mirrors 250, 260. The mirror 250 in the far-field couples a portion the emitted beam 282 back into the array of fiber amplifiers 210 through a small coupling hole 230 in the primary mirror 260. The coupled back portion is referred to as a coupled back beam 284. The two mirrors 250, 260 form a telescope 255, generating a collimated output beam 280 from the portion of the emitted beam 282 not reflected back into the fiber amplifier array 210.

With continued reference to FIG. 2, the emitted beam 282 typically has good beam quality in the far-field and is not effected adversely by the coupling hole 230. In effect, the system 200 not only filters out transverse modes, i.e., out-of-phase modes where the fiber amplifiers are not in-phase, but also filters out longitudinal modes that do not lead toga transverse distribution where all the emitted beams 282 are in-phase. The system 200 is not sensitive to the non-uniformity of fiber amplifier dimensions or separation between the fiber amplifiers. Therefore, the manufacturing tolerances for subcomponents of the fiber amplifier system can be relaxed.

The system 200 is also suitable for scaling to high power levels, such as multi-kilowatts, because the output beam 280 is not transmitted through a lens, such as the feedback reflector 150 in FIG. 1. Transmitting light through a lens may introduce aberrations due to thermal effects in the lens. Therefore, the system 200 is scalable in power, as well as number of fiber amplifiers. Moreover, the output beam 280 produced by the system 200 is automatically collimated without additional optics, reducing the number of subcomponents of the fiber amplifier system.

Figure 3:
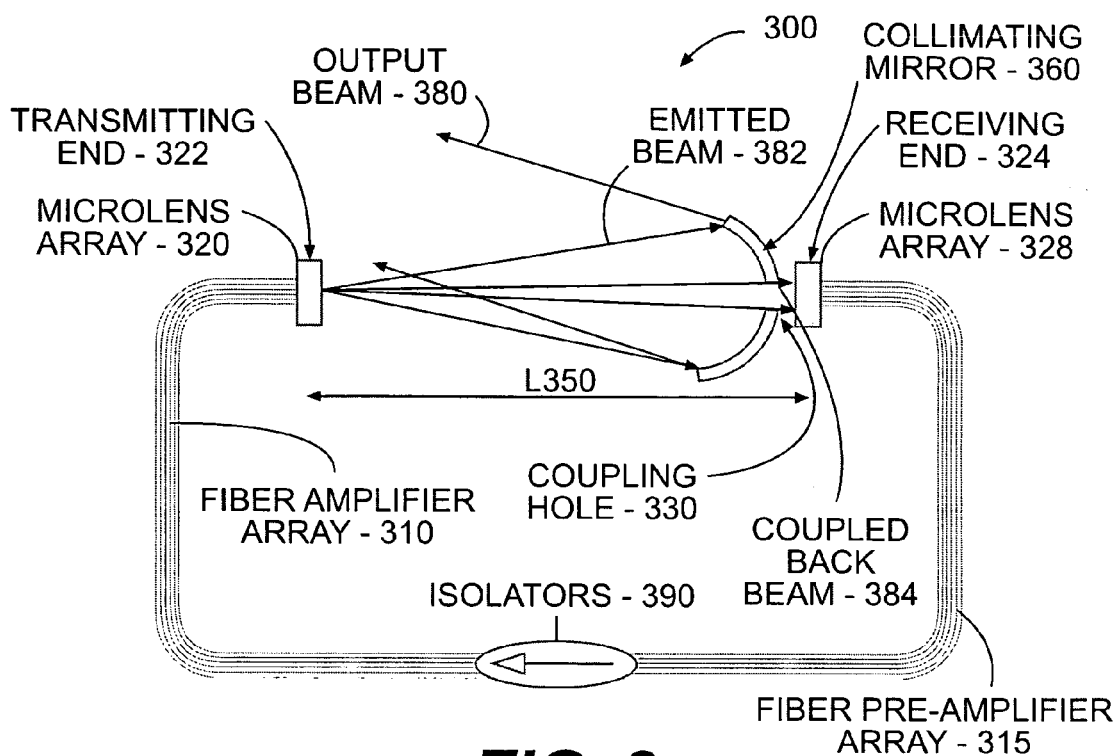

FIG. 3 illustrates a third exemplary embodiment of the fiber amplifier system 300 for passive phasing of fiber amplifiers. The system 300 uses a ring configuration. In the system 300, two ends 322, 324 of an array of fiber amplifiers 310 are positioned towards each other along an optical axis. The fiber amplifiers array 310 is unidirectional in construction because each fiber amplifier has an internal isolator 390 that allows beams to flow in one direction only (the direction of the arrow, for example). The fiber amplifier array 310 may be connected to an array of microlenses 320 at a transmitting end 322. The fiber amplifier array 310 may emit a beam 382 of high energy using the microlens array 320.

The system 300 further includes a curved collimating mirror 360 that intercepts a coherent sum of the emitted beam 382 from the fiber amplifiers array 310. The collimating mirror 360 collimates and reflects most of emitted beam 382 as a collimated output beam 380 except for a small portion, such as two or three percent. The collimating mirror 360 has a coupling hole 330, which allows the small portion of the emitted beam 382, referred to as a coupled back beam 384, to be coupled back into a receiving end 324 of the fiber amplifier array 310. The size of the coupling hole 330 may be as large as the receiving end 324.

With continued reference to FIG. 3, at the receiving end 324, an array of microlenses 328 receives and focuses the coupled back beam 384 into an array of fiber pre-amplifiers 315. The coupled back beam 384 typically has weak signals, which are amplified by the fiber pre-amplifier array 315 before being coupled into the array of fiber amplifiers 310. The microlens array 328 may be an array of tiny lenses. Each lens may have a diameter of approximately two hundred and fifty microns and may collect and focus the coupled back beam 384 into one of the fiber pre-amplifiers, for example. One microlens typically corresponds to one fiber amplifier or fiber pre-amplifier.

The in-phase mode typically has the highest intensity on the optical axis. The out-of-phase mode typically has zero intensity on the optical axis. Therefore, the in-phase mode may have the highest feedback and the lowest loss on the optical axis. The distance L 350 between the two ends 322, 324 of the fiber amplifier array 310 may be large enough to allow the coherent superposition of the emitted beam 382 to form a well defined central lobe for the in-phase mode. This length L 350 may be in the Rayleigh range, i.e., the range where the beam is basically collimated, for the transmitting fiber amplifiers.

The system 300 uses the low powered fiber pre-amplifier array 315 to increase the intensity of the optical signal, i.e., coupled back beam 384, before coupling the coupled back beam 384 into the high powered fiber amplifier array 310. Consequently, only a small portion, such as two or three percent, of the emitted beam 382 is needed for feedback. The system 300 is therefore more efficient. In addition, noises, such as amplified spontaneous emission (ASE), may be blocked by the isolator 390. The isolator 390 may also block stimulated Brilloumn scattering (SBS) because SBS typically propagates in the opposite direction.

Figure 4:
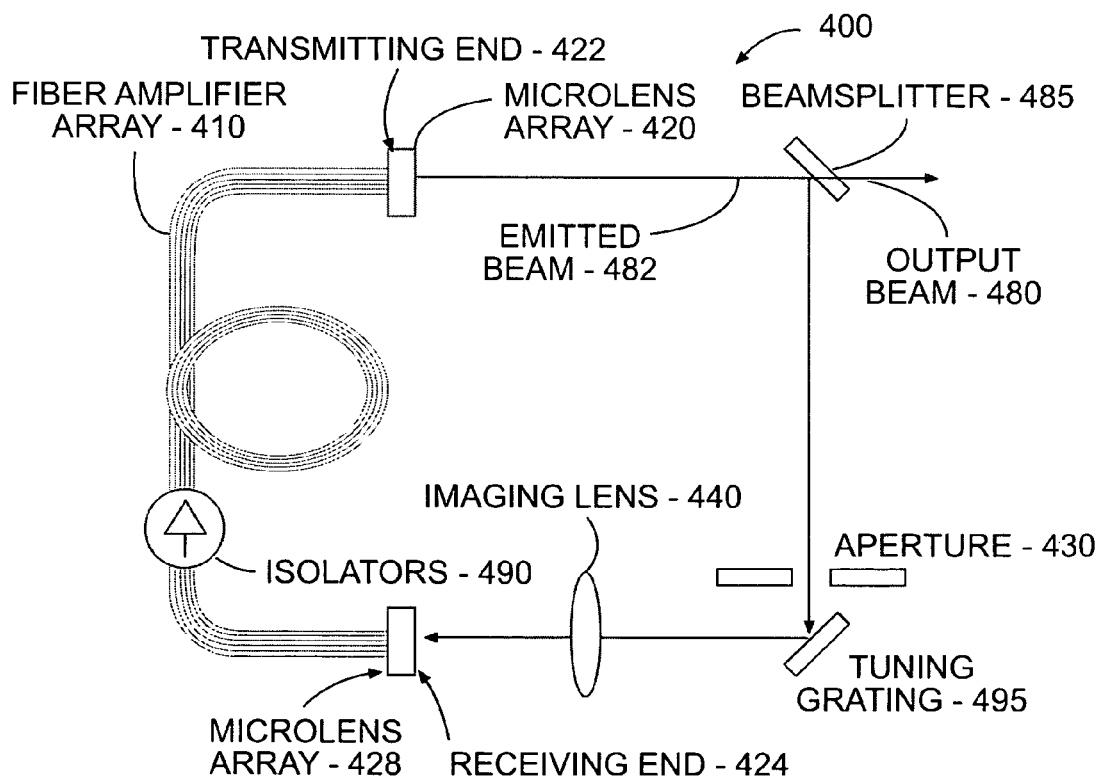

FIG. 4 illustrates a fourth exemplary embodiment of the fiber amplifier system 400 for passive phasing of fiber amplifiers. The system 400 uses a tuning grating 495 that enables frequency tuning. Compare with the system 300, the system 400 separates and positions a transmitting end 422 and a receiving end 424 of an fiber amplifier array 410 on a same side without facing each other. The fiber amplifier array 410 is connected to an array of microlenses 420 at the transmitting end 322. The fiber amplifier array 410 emits a beam 482 of high energy using the microlens array 420.

The system 400 further includes a beamsplitter 485 that redirects the emitted beam 482. The beamsplitter 485 may redirect a small portion, such as four percent, of the output beam 482 through an aperture 430. The small portion is referred to as a coupled back beam 484. The rest of the emitted beam 482 propagates through the beamsplitter 485 as an output beam 480. In the system 400, only the portion of the coupled back beam 484 with in-phase mode propagates through the aperture 430 to the tuning grating 495. The coupled back beam 484 is further redirected by the tuning grating 495 and coupled through an imaging lens 440. The tuning grating 495 enables tuning of the coupled back beam 484 to have variable frequencies. The tuning grating 495 promotes general wavelength resolution for the ring laser without being too restrictive to the requited wavelength band for the proper phasing of all of the fiber amplifiers arrays 410 of the system 400. At the receiving end 424 of the fiber amplifier array 410, an array of microlenses 428 receives and focuses the coupled back beam 484 into the fiber amplifier array 410.

The system 400 may also include an isolator 490 so that beams flow in one direction only. The isolator 490 may block ASE and SBS.

Figure 5:
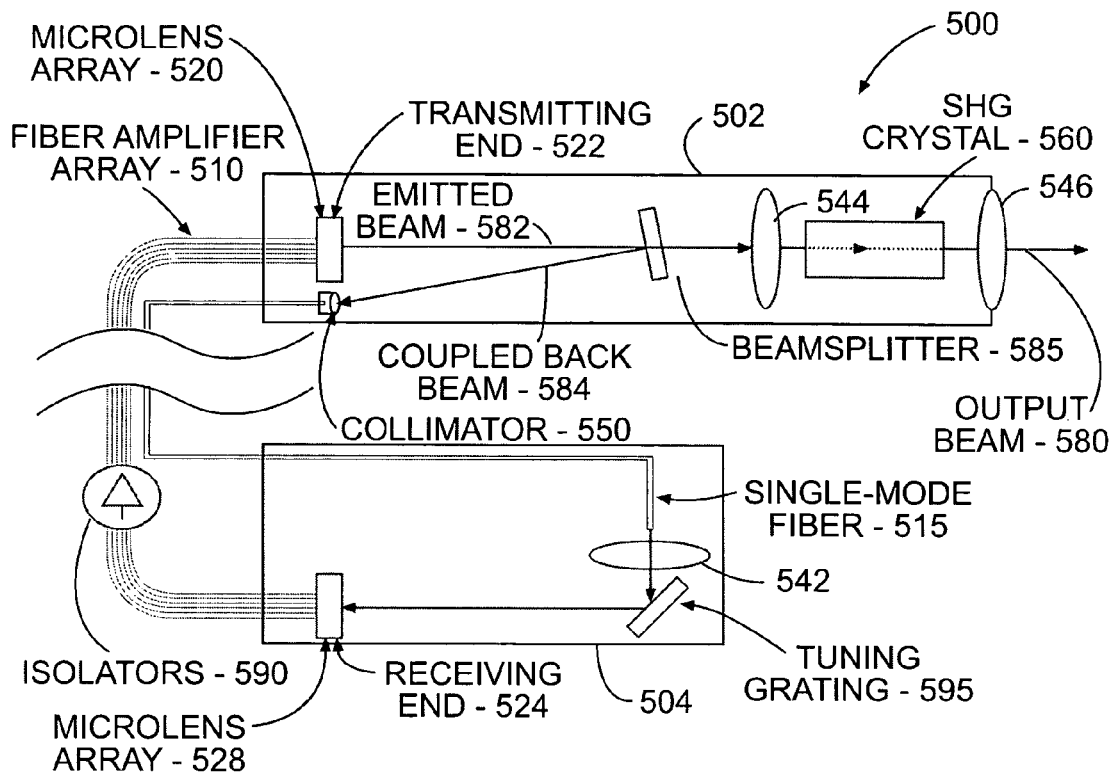

FIG. 5 illustrates a fifth exemplary embodiment of the fiber amplifier system 500 for passive phasing of fiber amplifiers. The system 500 has a compact design and enables frequency doubling of laser beams, thus allowing the use of different frequencies and wavelengths. The system 500 includes an array of fiber amplifiers 510 connected to an array of microlenses 520 at a transmitting end 522. The transmitting end 522 may be enclosed in an output head 502. The output head 502 may be, for example, a cylinder that is twenty to twenty-five centimeters long. The fiber amplifier array 510 emits a beam 582 using the microlens array 520.

The output head 502 may include a beamsplitter 585 that redirects a small portion, such as four percent, of the emitted beam 582 into a collimator 550. The small portion is referred to as a coupled back beam 584. The rest of the emitted beam 582 propagates through two lenses 544, 546 and a second harmonic generator (SHG) crystal 560, forming an output beam 580. As noted above, the line width of the fiber amplifier system is typically narrow because only a subset of the supported longitudinal modes lases. The narrow line width enables frequency doubling and Raman shifting. The SHG crystal 560 may double the frequency of the emitted beam 582, so that the emitted beam 582 may change from, for example, infrared to visible light as the output beam 580.

The coupled back beam 584 that is coupled into the collimator 550 may be transmitted to an input head 504. The input head 504 may be in a cylindrical shape similar to the output head 502. A single-mode fiber 515 may be used to transmit the coupled back beam 584. The single mode fiber 515 has Gaussian output, enabling beams to propagate long distances without diverging. Referring to FIG. 5, the single-mode fiber 515 transmits the coupled back beam 584 through a collimating lens 542. The lens 542 collimates the coupled back beam 584 onto a tuning grating 595. The tuning grating 595 tunes the frequency of the coupled back beam 584 and redirects the coupled back beam 584 into an array of microlens 528 at a receiving end 524 of the fiber amplifier array 510.

The system 500 may further include an isolator 590 that allows beams to travel in one direction only. The isolator 590 may also block noises, such as ASE and SBS.

Figure 6:
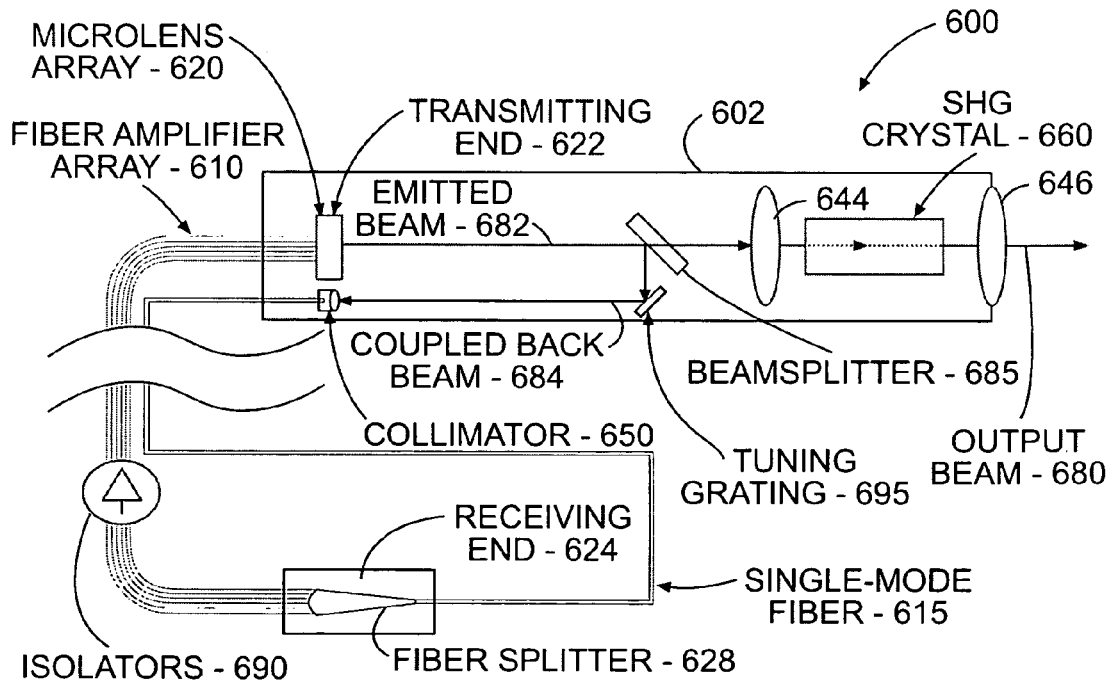

FIG. 6 illustrates a sixth exemplary embodiment of the fiber amplifier system 600 for passive phasing of fiber amplifiers. The system 600 uses a fiber splitter 628 to replace microlenses at a receiving end. Similar to the system 500, the system 600 includes an array of fiber amplifiers 610 connected to an array of microlenses 620 at a transmitting end 622. The transmitting end 622 may be enclosed in an output head 602. The output head 602 may be, for example, a cylinder that is twenty to twenty-five centimeters long. The fiber amplifier array 610 emits a beam 682 using the microlens array 620.

The output head 602 may include a beamsplitter 685 that redirects a small portion, such as four percent, of the emitted beam 682 into a tuning grating 695 and a collimator 650. The small portion is referred to a coupled back beam 684. The tuning grating 695 tunes the frequency of the coupled back beam 684. The rest of the emitted beam 682 propagates through two lenses 644, 646 and a SHG crystal 660, forming an output beam 680. The SHG crystal 660 may double the frequency of the emitted beam 682, so that the emitted beam 682 may change from, for example, infrared to visible light as the output beam 680.

With continued reference to FIG. 6, a single-mode fiber 615 may be used to transmit the coupled back beam 684 to the fiber splitter 628 at a receiving end 624 of the fiber amplifier array 610. The fiber splitter 628 may branch one fiber amplifier into a number of fiber amplifiers, allowing the coupled back beam 484 to be fed into a large number of input fiber amplifiers at the receiving end 624. Consequently, no microlenses are needed at the receiving end 624 of the fiber amplifier array 610 to receive the coupled back beam 684.

The system 600 may further include an isolator 690 that allows beams to travel in one direction only. The isolator 690 may also block noise, such as ASE and SBS.

With reference back to FIG. 2, the system 200 is modeled in an exemplary experiment using Gaussian beam propagation in an optical system represented by an ABCD matrix. The exemplary modeling experiment analyzes feedback fields emitted by the optical system and calculates energies of the coupled back beam 284 that is coupled back into the fiber amplifier array 210.

In the exemplary modeling experiment of the system 200, the array of fiber amplifiers 210 emits single-mode Gaussian beams 282 with identical spot sizes and powers. The exemplary modeling experiment first calculates the Gaussian beam emitted from each fiber amplifier and coupled into each microlens. The exemplary modeling experiment then propagates the resulting Gaussian beams 282 to an output coupler, such as the far-field mirror 250 in FIG. 2, and back into the microlens array 220. The fiber amplifier array 210 is at the focal plane of the microlens array 220. If the Gaussian beam emitted from each fiber amplifier has a waist radius of $w_0$, then the Gaussian beam 282 coupled back into the microlens array 220 may have a waist radius of $w_f$, which is given by, $$w_f = w_o \sqrt{1 + \left(\frac{\lambda f}{\pi w_o^2}\right)^2} \tag{1}$$

where f is the focal length of each microlens.

In the exemplary modeling experiment, the ABCD matrix of the propagation path from the microlens array 220 and back to the same array is {A,B,C,D}. The total feedback field at the microlens array 220 is given by, $$E_{fb}(x,y) = \sum_{n=1}^{N_x} \sum_{m=1}^{N_y} \frac{q_o}{Aq_o+B} e^{-\frac{i\pi}{\lambda}\left(\frac{Cq_o+D}{Aq_o+B}\right)[(x-AnT_x)^2+(y-AmT_y)^2]} \tag{2}$$

$$e^{-\frac{i2\pi}{\lambda}(CnT_x x + CmT_y y)} e^{i\left[\frac{\pi AC}{\lambda}(n^2 T_x^2 + m^2 T_y^2)\right]}$$

where, $$q_o = \frac{i\pi w_L^2}{\lambda} \tag{3}$$

and $T_x$ and $T_y$ are the array period along the x-axis and y-axis, respectively. The coherent and incoherent power intensities are given by, $$I_{coherent} = \left|\sum_{n,m} E_{n,m}(x,y)\right|^2 \tag{4a}$$

$$I_{incoherent} = \sum_{n,m} |E_{n,m}|^2 \tag{4b}$$

In the exemplary modeling experiment, $T_x$=250 μm, $w_L$=60 μm, A=1, B=78 cm, C=0, D=1. $w_L$ is the beam field radius (1/e) of the coupled back beam 284. The beam spot radius (1/e) of the emitted beam 282 is 4.4 μm. The microlens focal length is 780 μm, resulting in a beam spot radius of 60 μm at the microlens array plane.

Figure 7:
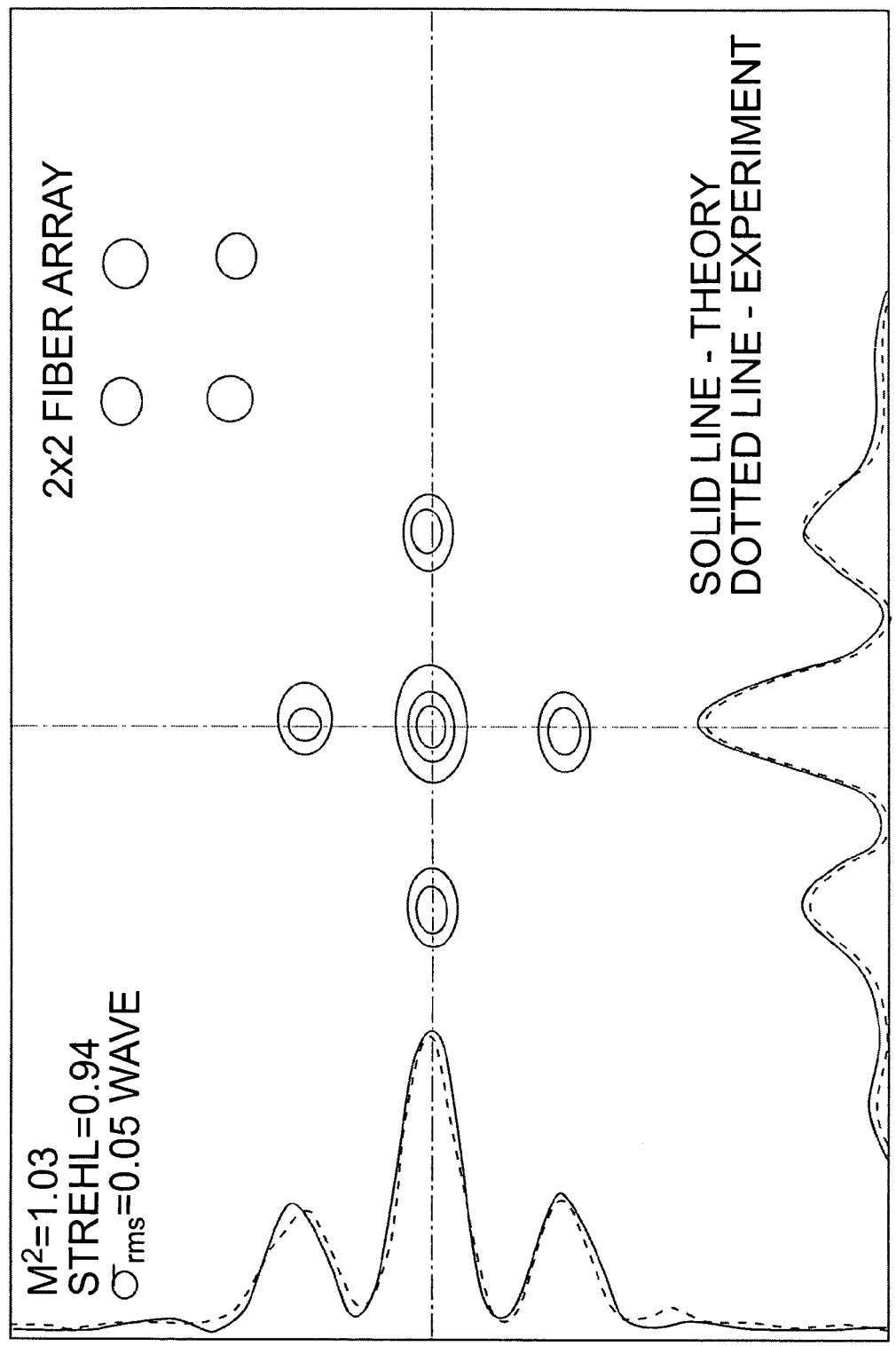
FIG. 7 illustrates an exemplary experimental far-field intensity profile for the exemplary embodiment of FIG. 4 of the fiber amplifier system.

FIG. 7 illustrates an exemplary experimental far-field intensity profile for the fiber amplifier system 400 of FIG. 4. In this exemplary experiment, a 2×2 two-dimensional fiber amplifier array 410 is used. A feedback signal is captured using the beam splitter 485 to direct a fraction of the emitted beam 482 into the imaging lens 440 of a single-mode fiber amplifier. This signal is first amplified by a pre-amplifier (shown in FIG. 3) before being split into four beams by a 1×4 fiber splitter (shown in FIG. 6). Each beam is fed into one of the fiber amplifiers in the array 410. The far-field intensity pattern is depicted in the frame captured by a charge coupled device (CCD) camera. The dotted line represents actual experimental intensity slices along the x-axis and y-axis. The solid line represents corresponding theoretical simulation of the experiment. As shown in FIG. 7, the experimental result closely correlates to the theoretical simulation. The beam quality is estimated to be about 1.03 ($M^2$) corresponding to an energy spread (RMS) phasing error of about 0.05.

Figure 8:
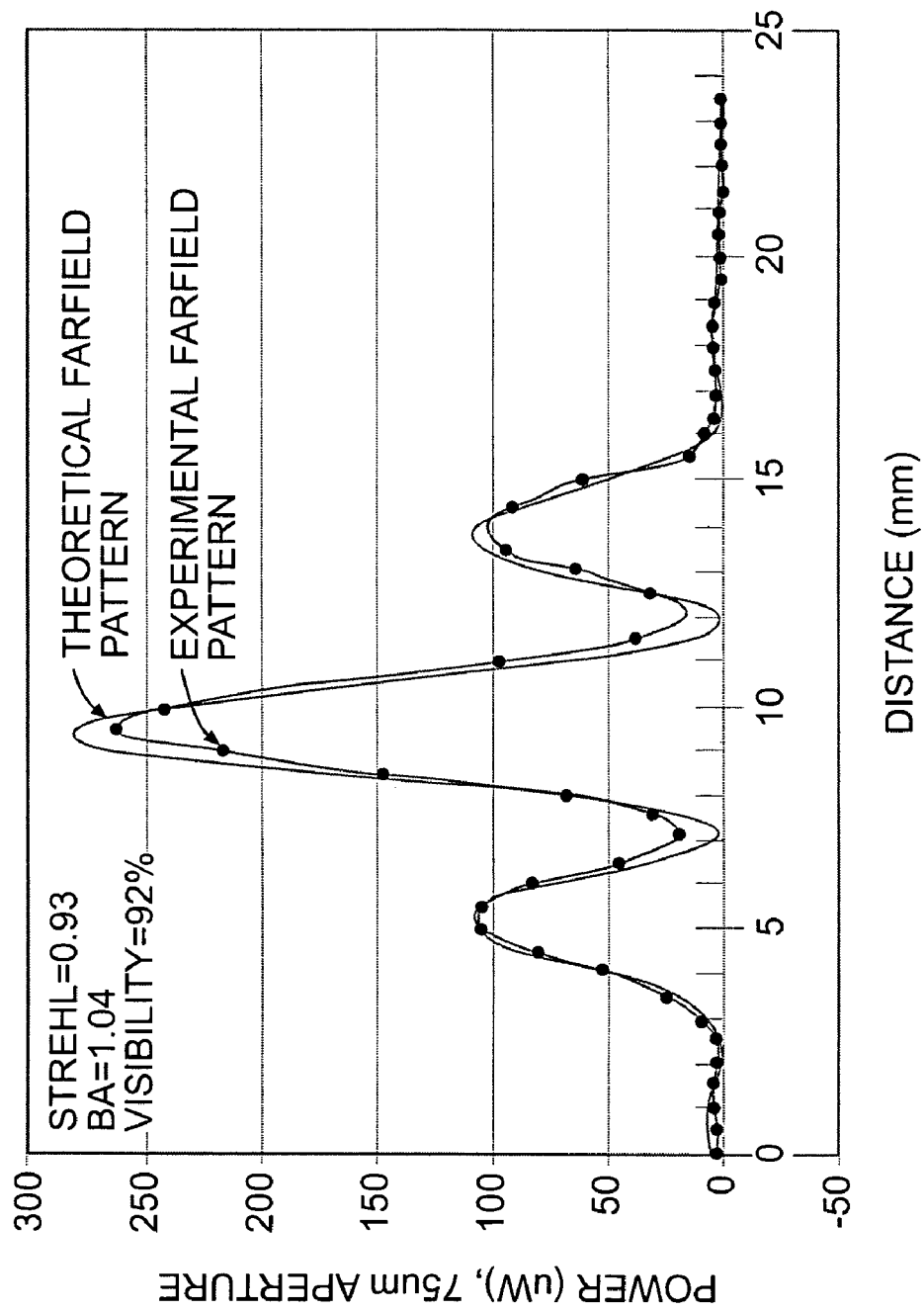
FIG. 8 illustrates a comparison of theoretical and experimental intensity profile measurement for two coupled fiber amplifiers.

FIG. 8 illustrates a comparison of theoretical and experimental intensity profile measurement for two coupled fiber amplifiers for the fiber amplifier system 400 of FIG. 4. The measured Strehl ratio for FIG. 8 was 0.93, corresponding to a beam quality of 1.04. The high coherence of this output is indicated by the relatively high visibility of 92%. The coherence length is estimated to be longer than 1 meter. The bandwidth is estimated to be about 200 MHz. An RF spectrum analyzer is used to measure the mode beats. The frequency separation of longitudinal mode is determined to be about 2.0 MHz, which is consistent with the calculated value. The fiber amplifiers have an average length of about 50 meters to within few centimeters. A refractive index of 1.45 may lead to a mode separation of 2.06 MHz. Theoretical estimates indicate that about one hundred neighboring longitudinal modes are present.

In a corresponding experiment, the frequency separation of the longitudinal modes is about only 2 MHz. The largest expected phase deviation in the fiber amplifier array depends on the deviation in the lengths of the fiber amplifiers and the frequency shift of the longitudinal mode with respect to the "resonant mode." The largest phase variance, i.e., the variation about a nominal value, is given by, $$\Delta\phi_{max} = 2(\Delta k_{max})(\Delta L_{max})n \tag{5}$$

where $\Delta\phi_{max}$ and $\Delta L_{max}$, are the maximum phase and length variation among the fiber amplifier array, respectively. The refractive index of the fiber amplifiers is represented by n=1.45. In this exemplary experiment, the fiber amplifiers have a length variation of 10 cm, and the maximum acceptable phase variation is 1 radian. Equation (5) thus indicates a bandwidth of $\Delta V_{max}$=170 MHz. The coherence length is given by $c/\Delta V_{max}$=1.8 meters. The measured coherence length is >1. meters. Since the mode separation is about 2 MHz, the number of longitudinal modes present is about eighty-five modes, which is close to the theoretical estimates of about 200 MH.

Figure 9:
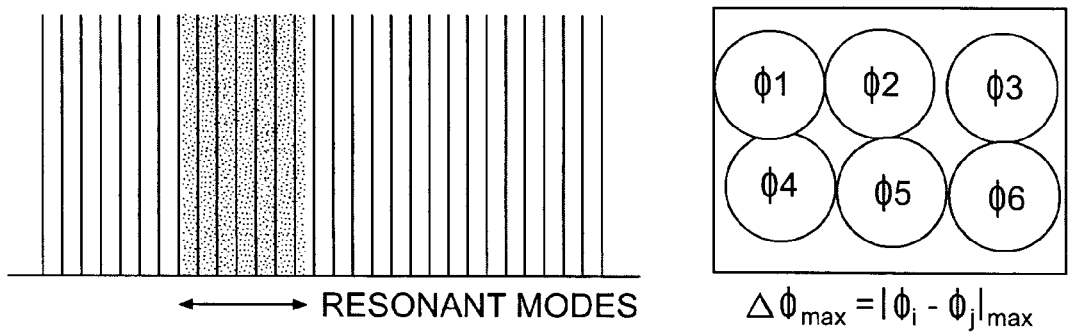
FIG. 9 schematically shows exemplary resonant modes with the highest feedback in locking and phasing the fiber amplifiers.

FIG. 9 schematically shows exemplary resonant modes. The resonant modes have maximum intensity on axis, and thus typically have the highest feedback power and thus dominate all other modes.

Figure 10:
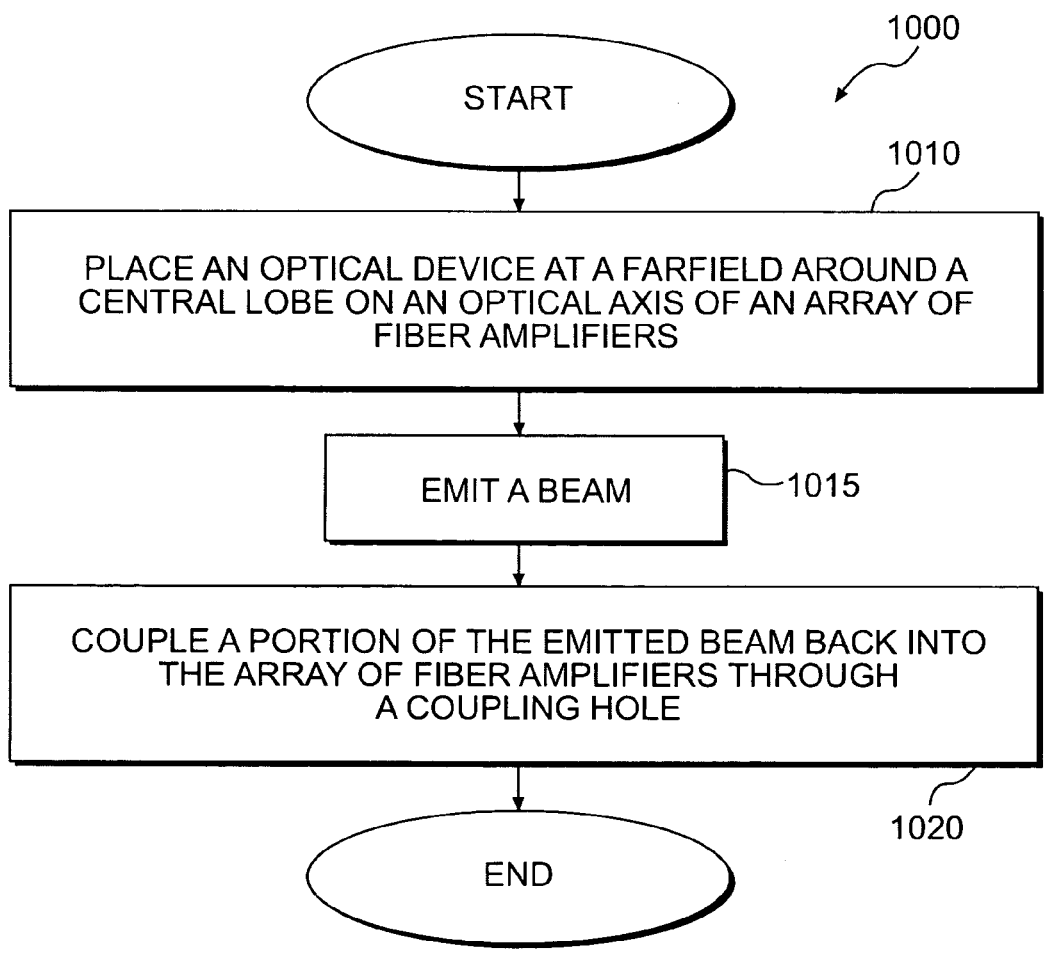
FIG. 10 is a flow chart illustrating an exemplary method for passive phasing of fiber amplifiers.

FIG. 10 is a flow chart illustrating an exemplary method 1000 for passive phasing of fiber amplifiers. The method 1000 places an optical device, such as a mirror 250, a collimating mirror 360, a beamsplitter 485, 585, 685, at a far-field around a central lobe on an optical axis of an array of fiber amplifiers 210, 310, 410, 510, 610 (block 1010). The array of fiber amplifiers 210, 310, 410, 510, 610 emits a beam 282, 382, 482, 582, 682 (block 1015). The method then couples a portion of the emitted beam 282, 382, 482, 582, 682 back into the array of fiber amplifiers 210, 310, 410, 510, 610 through a coupling hole 230, 330, 430 (block 1020 ). A first portion of the emitted beam 282, 382, 482, 582, 682 that is in-phase propagates through the coupling hole 230, 330, 430.

While the system and method for passive phasing of fiber amplifiers have been described in connection with an exemplary embodiment, those skilled in the art will understand that many modifications in light of these teachings are possible, and this application is intended to cover variations thereof.

What is claimed is:

1. A system for passive phasing of fiber amplifiers, comprising:
    an array of fiber amplifiers including a plurality of fiber amplifiers, the array of fiber amplifiers emitting a beam; and
    an optical device placed at a far-field of the array of fiber amplifiers, wherein the optical device couples a first portion of the emitted beam back into the array of fiber amplifiers through a coupling hole, and wherein only the first portion of the emitted beam propagates through the coupling hole, wherein the optical device is placed around a central lobe on an optical axis of the array of fiber amplifiers, wherein the optical device is a collimating mirror, and wherein the array of fiber amplifiers are configured as a ring with a transmitting end and a receiving end of the array of fiber amplifiers being positioned toward each other to form the ring.

2. The system of claim 1, wherein the optical device placed around a central lobe on an optical axis of the array of fiber amplifiers, wherein only the first portion of the emitted beam that is in-phase propagates through the coupling hole, and wherein the optical device couples two to three percent of the emitted beam back into the array of fiber amplifiers.

3. The system of claim 1, wherein the optical device placed around a central lobe on an optical axis of the array of fiber amplifiers, wherein only the first portion of the emitted beam that is in-phase propagates through the coupling hole, and wherein the optical device couples four percent of the emitted beam back into the array of fiber amplifiers.

4. The system of claim 1, wherein the optical device is placed around a central lobe on an optical axis of the array of fiber amplifiers, the system further comprising an isolator that transmits the first portion of the emitted beam in one direction, wherein the isolator blocks amplified spontaneous emission (ASE) and stimulated Brillouin scattering (SBS).

5. The system of claim 1, wherein the optical device is placed around a central lobe on an optical axis of the array of fiber amplifiers, the system further comprising an array of microlenses connected to the array of fiber amplifiers, wherein the array of microlenses includes a plurality of microlenses, each microlens corresponding to a single fiber amplifier.

6. The system of claim 1, wherein the optical device is placed around a central lobe on an optical axis of the array of fiber amplifiers, the system further comprising an array of microlenses that is connected to the array of fiber amplifiers and receives the first portion of the emitted beam.

7. The system of claim 1, wherein the optical device is placed around a central lobe on an optical axis of the array of fiber amplifiers, the system further comprising fiber Bragg grating (FBG) reflectors connected to the array of fiber amplifiers to form double-pass amplifiers.

8. The system of claim 1, wherein the optical device is placed around a central lobe on an optical axis of the array of fiber amplifiers, the system further comprising an array of pre-amplifiers that amplifies the first portion of the emitted beam before coupling the first portion of the emitted beam to the array of fiber amplifiers.

9. The system of claim 1, wherein the optical device is placed around a central lobe on an optical axis of the array of fiber amplifiers, wherein the collimating mirror outputs a second portion of the emitted beam as a collimated output beam, wherein the second portion of the emitted beam is not coupled back into the array of fiber amplifiers.

10. The system of claim 1, wherein the optical device is placed around a central lobe on an optical axis of the array of fiber amplifiers, wherein the optical device is a beamsplitter, wherein the array of fiber amplifiers are configured as a ring with a transmitting end and a receiving end of the array of fiber amplifiers being separated from each other to form the ring, and wherein the system further comprises:

a tuning grating that redirects the first portion of the emitted beam, wherein the tuning grating is capable of tuning frequencies.

11. A system for passive phasing of fiber amplifiers, comprising:

an array of fiber amplifiers including a plurality of fiber amplifiers, the array of fiber amplifiers emitting a beam and configured as a ring with a transmitting end and a receiving end of the array of fiber amplifiers being positioned toward each other to form the ring;

a collimating mirror placed at a far-field of the array of fiber amplifiers, wherein the collimating mirror couples a first portion of the emitted beam back into the array of fiber amplifiers through a coupling hole, and wherein only the first portion of the emitted beam propagates through the coupling hole; and an array of pre-amplifiers that amplifies the first portion of the emitted beam before coupling the first portion of the emitted beam to the array of fiber amplifiers.

12. The system of claim 11, wherein the collimating mirror is placed around a central lobe on an optical axis of the array of fiber amplifiers, wherein the collimating mirror outputs a second portion of the emitted beam as a collimated output beam, wherein the second portion of the emitted beam is not coupled back into the array of fiber amplifiers.

13. The system of claim 11, wherein the collimating mirror is placed around a central lobe on an optical axis of the array of fiber amplifiers, wherein only the first portion of the emitted beam that is in-phase propagates through the coupling hole, and wherein the collimating mirror couples two to three percent of the emitted beam back into the array of fiber amplifiers.

14. The system of claim 11, wherein the collimating mirror is placed around a central lobe on an optical axis of the array of fiber amplifiers, wherein only the first portion of the emitted beam that is in-phase propagates through the coupling hole, and wherein the collimating mirror couples four percent of the emitted beam back into the array of fiber amplifiers.

15. The system of claim 11, wherein the collimating mirror is placed around a central lobe on an optical axis of the array of fiber amplifiers, the system further comprising an isolator that transmits the first portion of the emitted beam in one direction, wherein the isolator blocks amplified spontaneous emission (ASE) and stimulated Brillouin scattering (SBS).

16. The system of claim 11, wherein the collimating mirror is placed around a central lobe on an optical axis of the array of fiber amplifiers, the system further comprising an array of microlenses connected to the array of fiber amplifiers, wherein the array of microlenses includes a plurality of microlenses, each microlens corresponding to a single fiber amplifier.

17. The system of claim 11, wherein the collimating mirror is placed around a central lobe on an optical axis of the array of fiber amplifiers, the system further comprising fiber Bragg grating (FBG) reflectors connected to the array of fiber amplifiers to form double-pass amplifiers.

* * * * *